Nov. 8, 1960
T. N. HUBBARD
2,958,959
GLOBE MOUNTING
Filed March 3, 1958
2 Sheets-Sheet 1
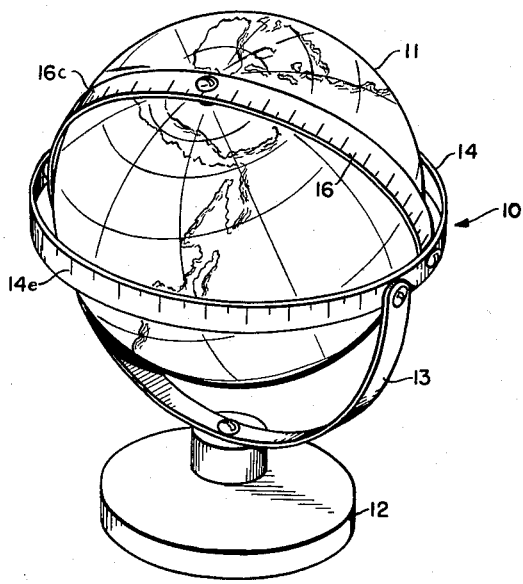
FIG. 1
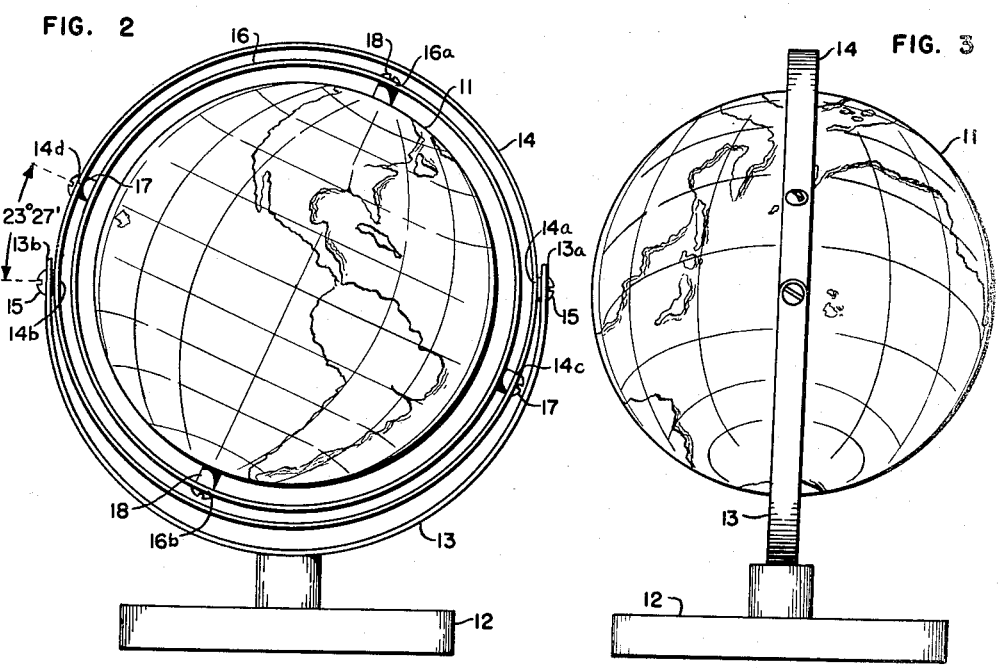
FIG. 2
FIG. 3
INVENTOR
THOMAS N. HUBBARD
BY
*Schroeder, Hofgren, Brady & Wegner*
ATTORNEYS Nov. 8, 1960 T. N. HUBBARD 2,958,959
GLOBE MOUNTING Filed March 3, 1958 2 Sheets-Sheet 2

INVENTOR
THOMAS N. HUBBARD
BY
ATTORNEYS

United States Patent Office 2,958,959
Patented Nov. 8, 1960

2,958,959

GLOBE MOUNTING

Thomas N. Hubbard, Northbrook, Ill., assignor to Rand McNally & Company, a corporation of Illinois Filed Mar. 3, 1958, Ser. No. 718,583

3 Claims. (Cl. 35—46)

This invention relates to a globe mounting and in particular to a mounting permitting rotation of the globe about the polar axis.

One method of mounting a world globe is to allow it to rest freely in a cradle. With such a free ball mounting, the globe may be rotated so that any portion thereof may be placed uppermost as desired. Such a universal positioning of the globe is highly desirable for certain purposes, such as locating geographical points; however, such a free ball mounting has the serious disadvantage of not providing means for readily rotating the globe about the polar axis. As many measurements and determinations require such a rotation, the free ball mounting of the globe seriously limits the usability thereof as for educational purposes.

A number of globe mountings mount the globe for rotation about its polar axis. The known rotation-allowing mountings, however, have the serious disadvantage of precluding the universal positioning of the globe.

The principal feature of this invention is the provision of a new and improved globe mounting which permits universal positioning of the globe while supporting the globe for rotation about its axis.

Another feature of the invention is that the globe mounting readily and automatically disposes the globe axis at the angle of the ecliptic when desired.

A further feature is that the mounting comprises a great circle ring pivotally connected at diametrically opposite points to horizontally spaced portions of a fixed support, and a meridian ring pivotally connected to the great circle ring at diametrically opposite points and having diametrically opposite means for supporting the globe for rotation about its axis, the last named means being disposed midway between the connections of the meridian ring to the great circle ring.

Still another feature is that the meridian ring is connected to the great circle ring at diametrically opposite points spaced from the points of connection of the great circle ring to the support an angular distance equal to the angle of the ecliptic.

A further feature is the provision of such a globe mounting including an additional great circle ring such as a horizontally fixed horizon ring.

Yet another feature is that the means effecting the pivotal connections are arranged to retain releasably the rings in a desired pivotal position.

A yet further feature is that the pivotal connecting means are arranged to maintain frictionally the relative pivotal relationships.

Other features and advantages of the invention will be apparent from the following description taken in connection with the accompanying drawings wherein:

Fig. 1 is an isometric view of a globe assembly having a globe mounting embodying the invention;

Fig. 2 is a front elevation thereof showing the rings in alignment with the support;

Fig. 3 is a side elevation thereof;

Figure 4:
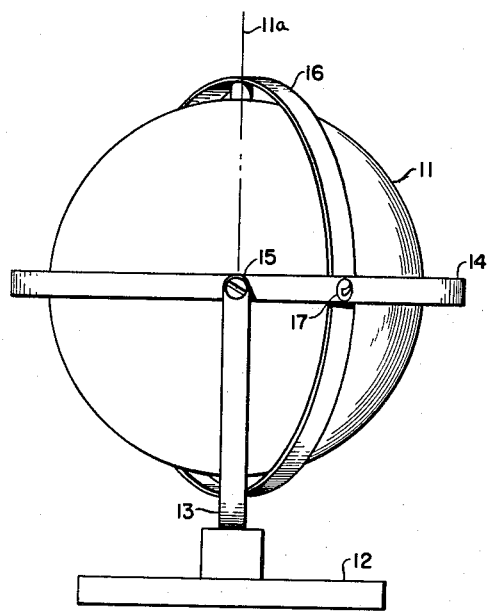
Fig. 4 is a side elevation showing the great circle ring extending horizontally and the meridian ring extending vertically.

In the exemplary embodiment of the invention as disclosed in Figs. 1 through 6 of the drawings, a globe assembly is shown to comprise a mounting generally designated 10 carrying a globe 11 for rotation about its polar axis. Globe mounting 10 is further arranged so that any portion of the globe 11 may be moved to an uppermost position as desired. The globe mounting comprises a plurality of pivotally associated rings which encircle the globe and which may be used for making numerous measurement determinations as will be described more fully subsequently. In addition, the globe mounting is readily disposable in an aligned arrangement wherein the axis of the globe is disposed at an angle to the vertical equal to the angle of the ecliptic for facilitating celestial determinations.

More specifically, a globe mounting 10 comprises a base 12 from which upstands a fixed support 13, herein a semicircular member having upper horizontally spaced portions 13a and 13b. A first great circle ring 14 is pivotally connected at diametrically opposite points 14a and 14b to ends 13a and 13b of the support by connecting means 15.

A second great circle ring comprising a meridian ring 16 is pivotally connected by connecting means 17 to great circle ring 14 at a pair of diametrically opposite points 14c and 14d on the great circle ring 14. Points 14c and 14d are angularly spaced from points 14a and 14b, respectively at a distance equal to the angle of the ecliptic, which angle is substantially 23° 27'.

Globe 11 is mounted on meridian ring 16 for rotation about its diametrical polar axis by connecting means 18 at diametrically opposite points 16a and 16b on the meridian ring. Points 16a and 16b are equidistant between connecting means 17 (and, thus, from points 14c and 14d of the great circle ring).

Each of rings 14 and 16 may be provided with one or more scales, such as mileage scale 14e on great circle ring 14 and angular scale 16c on meridian ring 16. Additional scales (not shown) may be provided, such as an angular scale on the great circle ring to show longitude or degrees along any great circle, an hour scale to show time zones and time comparisons for making determinations such as the time of sunrise, the time of sunset and the length of any given day or night, a scale showing the days of the year for use in determining the sun's position at any date, etc. The meridian ring may be provided further with an angular scale to show degrees of latitude, etc.

While it is desirable to provide for ready pivotal movement of the rings 14 and 16 where the globe is used for educational purposes, it is preferable that the rings be releasably maintainable in a desired relationship when desired. For this purpose, the connecting means 15 and 17 are arranged to provide a frictional connection and, if desired, the connecting means may be adjustable to vary the degree of retention in accordance with the user's needs.

In Figs. 2 through 6, a number of different arrangements of the great circle and meridian rings is illustrated. Thus, in Figs. 2 and 3, an aligned relationship of the rings with the support 13 is shown. As best seen in Fig. 2, in the aligned relationship, the globe axis is disposed at the angle of the ecliptic from the vertical (the conventional arrangement of the fixed axis type of globe mounting). In Fig. 4, the great circle ring 14 is arranged horizontally to become a horizon ring, and the meridian ring 16 is arranged vertically to extend the polar axis 11a of the globe 11 vertically. Thus, in Fig. 4, the globe is arranged in a "parallel" position wherein the equator is parallel to the horizon.

Figure 5:
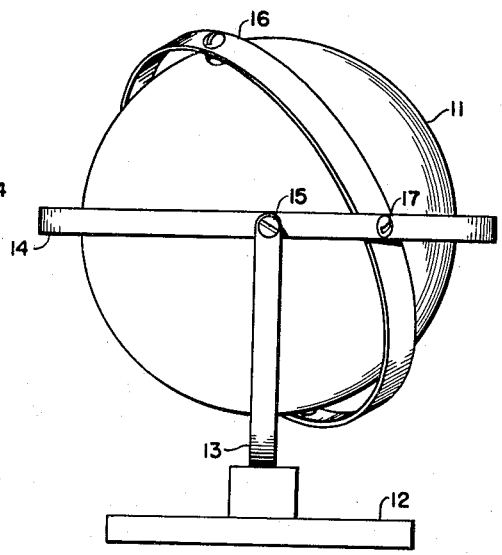
Fig. 5 is a side elevation similar to that of Fig. 4, but with the meridian ring inclined to the vertical.
Figure 6:
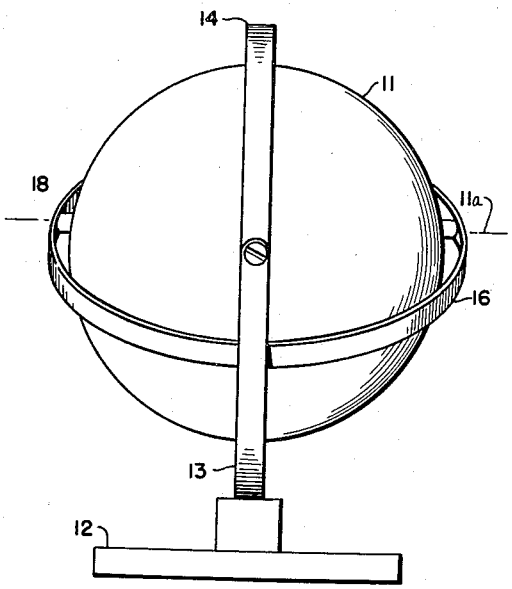
Fig. 6 is a side elevation similar to that of Fig. 3, but with the meridian ring pivoted relative to the great circle ring so as to dispose the globe pivotal axis horizontally.

In Fig. 5, great circle ring 14 is arranged horizontally as a horizon ring, while meridian ring 16 is arranged in a plane extending angularly to the plane of the horizon. Thus, the globe is disposed in an "oblique" arrangement wherein the equator is inclined to the horizon as is used in rectifying the globe. In Fig. 6, the great circle ring 14 is vertically arranged and the polar axis 11a of the globe extends in a horizontal plane, placing the globe in a "right" or "direct" arrangement wherein the equator is perpendicular to the horizon.

The illustrative examples of the different arrangements of the rings 14 and 16 permit a substantial number of different observations, measurements and determinations to be made with globe 11. Other relative arrangements of the rings, and suitable corresponding scales thereon may be utilized within the scope of the invention. It should be noted that the adjustable positioning of rings 14 and 16 permits ready simulation of great circle orbits, permitting such orbits to be studied and understood with improved facility.

Figure 7:
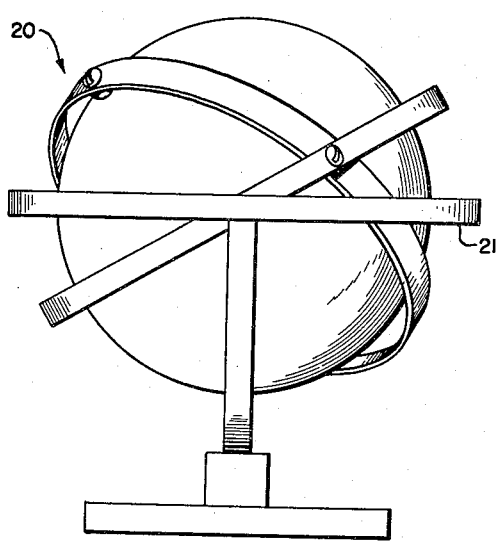
Fig. 7 is a side elevation showing a modified form of globe mounting having an additional great circle element comprising a fixed horizon ring.

In Fig. 7 is shown a modified form of globe mounting, generally designated 20, generally similar to globe mounting 10 but provided with an additional great circle ring 21 comprising a fixed horizon ring. Thus, a fixed reference great circle is provided at all times further facilitating the use of the pivotally movable rings.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A mounting for use with a globe having markings thereon correlated with a preselected polar axis of the globe, comprising: a fixed support having horizontally spaced portions; a great circle ring resistively pivotally connected to said portions at diametrically opposite, first points; and a meridian ring pivotally connected to the great circle ring at diametrically opposite, second points spaced from said first points an angular distance equal to the angle of the ecliptic, and having diametrically opposite means supporting the globe at the extremities of siad preselected polar axis to rotate about said axis.

2. A globe assembly comprising: a globe having markings thereon correlated with a preselected polar axis; a fixed support extending circularly at least 180°; a great circle ring resistively pivotally connected to the support at diametrically opposite, horizontally spaced, first points; and a meridian ring resistively pivotally connected to the great circle ring at diametrically opposite, second points spaced from said first points an angular distance equal to the angle of the ecliptic, and having diametrically opposite means supporting the globe at the extremities of said preselected polar axis for rotation about said polar axis, said means being disposed 90° from said second points.

3. A mounting for use with a globe having markings thereon correlated with a preselected polar axis of the globe, comprising: horizon ring means; support means retaining the horizon ring means in a horizontal arrangement; a great circle ring resistively pivotally connected to one of said means at diametrically opposite, first points; and a meridian ring resistively pivotally connected to the great circle ring at diametrically opposite, second points spaced from said first points an angular distance equal to the angle of the ecliptic, and having diametrically opposite means spaced 90° from said second points for supporting the globe at the extremities of said preselected polar axis to rotate about said axis and dispose said polar axis vertically when said great circle ring is aligned with the horizon ring.

References Cited in the file of this patent

UNITED STATES PATENTS

| | | |
|---|---|---|
| 662,484 | Ziehl | Nov. 27, 1900 |
| 766,276 | Mackenzie | Aug. 2, 1904 |
| 1,077,340 | Graham | Nov. 4, 1913 |
| 2,279,162 | Dupler | Apr. 7, 1942 |
| 2,408,651 | Kiehl | Oct. 1, 1946 |

FOREIGN PATENTS

| | | |
|---|---|---|
| 299,975 | Germany | Aug. 20, 1917 |